United States Patent [19]

Park

[11] 4,266,042

[45] May 5, 1981

[54] POLYETHER-BASED POLYURETHANE FOAMS INCLUDING A FLAME-RETARDANT SYSTEM CONTAINING ANTIMONY TRIOXIDE, A CHLORINATED PARAFFIN AND ALUMINA TRIHYDRATE AND METHOD OF PREPARATION

[75] Inventor: Ronald S. Park, Noble Park, Australia

[73] Assignee: Henderson's Industries Limited, Parkville, Australia

[21] Appl. No.: 52,540

[22] Filed: Jun. 27, 1979

Related U.S. Application Data

[63] Continuation-in-part of Ser. No. 935,057, Aug. 18, 1978, abandoned.

[30] Foreign Application Priority Data

Aug. 22, 1977 [AU] Australia .................... PD1318/77
Aug. 15, 1978 [AU] Australia ...................... 38932/78
Apr. 26, 1979 [AU] Australia .................... PD8548/79

[51] Int. Cl.³ ............................................. C08G 18/14
[52] U.S. Cl. .................................... 521/123; 252/182; 521/132; 521/137; 521/159; 521/174

[58] Field of Search ............... 521/174, 137, 159, 132, 521/123; 252/182

[56] References Cited

U.S. PATENT DOCUMENTS

| 3,075,927 | 1/1963 | Lanham | 521/123 |
| 3,075,928 | 1/1963 | Lanham | 521/137 |
| 3,262,894 | 7/1966 | Green | 521/123 |
| 3,799,897 | 3/1974 | Suzuki et al. | 521/123 |
| 3,876,571 | 4/1975 | Cobbledick et al. | 521/137 |
| 3,925,266 | 12/1975 | Fabris et al. | 521/132 |
| 3,931,062 | 1/1976 | Cobbledick | 521/137 |

*Primary Examiner*—Maurice J. Welsh
*Attorney, Agent, or Firm*—Blum, Kaplan, Friedman, Silberman & Beran

[57] ABSTRACT

Polyether-based polyurethane foams including as the flame-retardant, an antimony compound, chlorine derived from at least one chlorinated paraffin and alumina trihydrate, and the polyol used to prepare the foams being a diol- or triol-based polyol wherein at least 50% of the hydroxyl end groups are primary hydroxyl end groups, having good flame-retardancy and without any significant fall-off in physical properties as the foams are able to tolerate relatively high levels of the flame retardant.

18 Claims, No Drawings

POLYETHER-BASED POLYURETHANE FOAMS INCLUDING A FLAME-RETARDANT SYSTEM CONTAINING ANTIMONY TRIOXIDE, A CHLORINATED PARAFFIN AND ALUMINA TRIHYDRATE AND METHOD OF PREPARATION

CROSS REFERENCE TO RELATED APPLICATIONS

This application is a continuation-in-part of application Ser. No. 935,057, filed on Aug. 18, 1978 and now abandoned.

BACKGROUND OF THE INVENTION

The present invention relates to high-resilience, flexible and semi-flexible, flame-resistant, polyether-based, polyurethane foams and formulations for preparing the same.

In recent years there has been a growing awareness of the need for greater resistance to combustion of seating and trim materials, particularly in applications where a number of people may be at risk at the one time, such as rail carriages, aircraft, buses, boats, public buildings and hospitals where large amounts of combustible materials are present. Polyvinyl chloride foams (PVC) have relatively good performance in fire, but their comfort and recovery properties are poor. Thin liner sheets of special neoprene (polychloroprene) have been used to protect polyurethane seat pads, but when the liner is cut as a result of vandalism, the degree of protection is reduced or eliminated. Since polyurethane is currently by far the most widely used cushioning material, continuing attempts have been made to improve its resistance to combustion, but so far the success achieved has been very limited. Research carried out in all developed countries has been based on the inclusion of a wide range of fire retardant materials in the urethane reaction mixture. However, when the proportion of fire retardant materials is increased beyond quite low levels, the result has been a severe falling off in properties such as compression set so that either the improvement in fire retardance has been minimal, or performance of the foam in service has been unacceptable.

It is the purpose of this invention to produce flexible or semi-flexible foams with very high levels of flame retardance yet with a combination of physical properties equal to the combination of physical properties in the best foams currently available. These foams can be moulded, cut to shape or laid down on a backing material, so affording protection against fire in depth.

Flexible and semi-flexible foams only are within the ambit of this invention. The term "flexible", as understood in the art, indicates the use of polyols the molecular weights of which are between 1000 and 10,000 but usually between 3000 and 6500, and the functionality of which is 2 to 3, reacted with isocyanates having a functionality of two or three, to form the foam. These foams have relatively low crosslink densities. The term "semi-flexible" indicates the additional inclusion of low molecular weight multi-functional reactants to the foam system previously described, (or by other methods well known in the art) to produce foams with relatively high crosslink densities.

Even the evaluation of fire retardance is a vexed question, and innumerable test methods have been developed in attempts to ascertain the behaviour of cellular materials in a fire. It has now become generally recognized that small scale laboratory tests are of limited value and are useful mainly only for process control purposes. A useful way to predict behaviour in an actual fire situation is with a full scale and complete seat assembly with a correspondingly large heat source. Such tests may be made under specified conditions or if not carried out in a conditioned environment the tests may be conducted with different materials at the same time to compare the behaviour of these different materials. The latter tests have in fact been conducted. The heat source consisted of 125 gm of newspaper crumpled into balls and placed in one double sheet of newspaper made up into a box. This total fire load was placed on the foam cushion in contact with the "squab". Two $15'' \times 15'' \times 4''$ pieces of foam, one to act as the "cushion", the other as the squab, were placed on a public transport type seat totally made from metal, as they would be when part of a normal seat construction. That is, the squab was placed against the back of the seat which was of sheet metal, at an angle, and the cushion was placed on the horizontal sheet metal seat in front of and in contact with the squab. The metal seat was enclosed in a hood to prevent draughts which might adversely affect some trials and not others, Observations were made and times recorded at the height of the burning ignition source, at the height of involvement of the foam, and after the finish of the trial. for ease of later reference, such tests are called 'the Transport Test'.

As previously suggested it has been difficult in the past to produce a flexible polyurethane which would behave well in the abovementioned tests. ICI state, for instance, in their Technical Service Note No. TS/B/2119/1 Table 16, Page 12 that the cited foams when tested according to ASTM D 1692-59T, method 9, Appendix 1, could only be rated "self-extinguishing" and not "non-burning".

In the formulations quoted by ICI on Page 13 of the abovementioned publication, 7.5 parts of antimony trioxide and 15 parts of a chlorinated paraffin namely Cereclor 56L or 65L, suggest an optimum level (or ceilings) of these flame retardants it is possible to include in the formulation. The polyether employed in all these formulations is Daltocel T56, a polyol which contains in the main secondary hydroxyl end groups.

The prior art discloses various means for imparting flame-retardant properties to polyurethane foams. For example, U.S. Pat. Nos. 3,075,927 and 3,075,928 to Union Carbide Corporation disclose polyurethane foams in which flame-retardance is imparted by a combination of antimony trioxide and a vinyl chloride resin.

In British Pat. No. 1,453,178 to M. & T. Chemicals Inc. the flame-retardance is provided by a composition consisting essentially of antimony trioxide, a halogen-containing polymer such as a vinyl chloride resin, and barium carbonate.

British Pat. No. 1,256,672 to The General Tire & Rubber Company describes polyurethane foams in which flame-retardance is imparted by a combination of a solid halogen-containing polymeric resin such as a vinyl chloride resin, zinc oxide and antimony oxide.

U.S. Pat. No. 3,876,571, again to General Tire, is similar to British Pat. No. 1,256,672, and teaches a chlorinated paraffin replacing up to as much as 80% by weight of the solid halogen-containing polymeric resin in this polyvinyl chloride, zinc oxide ad antimony oxide based flame-retardant combination.

U.S. Pat. No. 3,884,849, once again to General Tire, is similar to U.S. Pat. No. 3,876,571, except that there is also present in the combination a zinc salt of an organic monocarboxylic acid or of an organic mono dithiocarbamic acid and, moreover, the chlorinated paraffin is optional as a replacement for part of the solid halogen-containing polymeric resin. U.S. Pat. No. 3,931,062, a yet further grant to General Tire, is similar to U.S. Pat. No. 3,884,849, except that instead of the zinc salt there is employed an oxide, hydroxide or basic salt of certain Group 2a metals, namely magnesium, calcium, strontium or barium.

U.S. Pat. No. 3,799,897 to Toyo Rubber Chemical Industrial Corporation reveals a flame-proof composition of antimony oxide and chlorinated paraffin for polyurethane foams and to this extent differs from say U.S. Pat. Nos. 3,075,927 and 3,075,928 where a vinyl chloride resin is employed in accompaniment with the antimony oxide.

British Pat. No. 1,456,805 to The Upjohn Company discloses flame-retardant flexible polyurethane foams including a combination of antimony oxide, a polyhalogenated aromatic compound and alumina trihydrate.

British Pat. No. 1,368,931 to General Tire incorporates into the foam composition a combination of a solid halogen-containing polymeric resin such as, for example, a vinyl chloride resin, alumina trihydrate and antimony trioxide. Up to 70% by weight of the polymeric resin can be replaced by a chlorinated paraffin. This specification discloses an improvement in the fire retardant effect arising with an increasing concentration of polymeric resin, antimony trioxide and alumina trihydrate (subject to the limits therein specified). However, in this case those skilled in the art would appreciate that the viscosity of the mixture would be such that it would be probable that many conventional machines currently used in commercial production could not be used without modification. The specification teaches that replacement of part of the halogen-containing polymer with a chlorinated paraffin, still gives "useful" foams having sufficient extinguishing properties. However, this qualification is coupled with the warning that when all of the resin is replaced with chlorinated paraffin, the resulting foams exhibit poor cell character, tend to collapse, show poor charring and are not self-extinguishing.

Workers in this area have faced a particular problem for while it has been possible to make some foams with acceptable fire retardant properties, the physical properties of many of these foams are such that the material is only suitable for purposes such as providing insulation, etc. when the material is encapsulated or otherwise contained. Other foams, while having acceptable physical properties, do not have adequate fire retardant properties. Accordingly, it is desirable to produce a polyurethane foam having adequate fire retardant properties and at the same time having the physical properties necessary for applications such as seat cushioning, particularly in public transport vehicles, and for mattresses, particularly in public hospitals.

Notwithstanding the teaching of the prior art it has been surprisingly discovered that these results may be achieved without the need for incorporating a polymeric resin in the foam. A feature of the present invention is the selection of the polyol. More particularly, the polyol must be a diol- or triol-based polyol wherein at least 50% of the hydroxyl end groups are primary hydroxyl end groups.

SUMMARY OF THE INVENTION

Thus, according to a first aspect of the invention, there is provided a high-resilience, flexible or semi-flexible, flame-retardant, polyether based polyurethane foam which is suitable for moulding. The polyurethane foam is formed by reacting (a) a diol- or triol-based polyol wherein at least 50% of the hydroxyl end groups are primary hydroxyl end groups with (b) an isocyanate, a mixture of isocyanates or an isocyanate adduct or prepolymer, in the presence of (c) an effective amount of a flame-retardant system including (1) a chlorinated paraffin, (2) antimony trioxide and (3) alumina trihydrate.

Accordingly, it is a primary object of the invention to provide an improved polyether based polyurethane foam.

A further object of the invention is to provide a polyether based polyurethane foam including an improved fire retardant system which does not adversely affect the physical properties of the foam.

Another object of the invention is to provide a polyether based polyurethane foam of improved fire retardant properties suitable for moulding.

Still another object of the invention is to provide an improved polyether based polyurethane foam of improved fire retardant properties suitable for use as seat cushioning, particularly in public transport vehicles.

Yet another object of the invention is to provide a method of preparing a polyether based polyurethane foam derived from a diol- or triol-based polyol wherein at least 50% of the hydroxyl end groups are primary hydroxyl end groups and an isocyanate having an improved fire retardant system of a chlorinated paraffin, antimony trioxide and alumina trihydrate.

Still other objects and advantages of the invention will in part be obvious and will in part be apparent from the specification.

The invention accordingly comprises the several steps and the relation of one or more of such steps with respect to each of the others, and the composition possessing the features, properties and the relation of constituents which are exemplified in the following detailed disclosure, and the scope of the invention will be indicated in the claims.

DESCRIPTION OF THE PREFERRED EMBODIMENTS

It will be readily appreciated that normally when preparing a polyurethane foam the isocyanate component is kept separate from the remaining reactants until the final mixing of the foam. An exception occurs where a prepolymer, quasi-prepolymer or adduct is first prepared by reacting the isocyanate with a part of the polyol to produce an isocyanate-terminated compound and this compound is then reacted with the remainder of the polyol. Another exception arises where the whole of the isocyanate is reacted with the other components in the presence of a delayed action or heat activated catalyst and the reaction product laid down in the form of a carpet underlay or like material. Generally, however, the system will take the form of a three-part mix comprising (i) a preblend or masterbatch of polyol, antimony trioxide, a chlorinated paraffin or a mixture of chlorinated paraffins, and alumina trihydrate;

(ii) a further blend including one or more catalysts; and (iii) an isocyanate.

Polyols used in making the polyurethanes of the present invention are diols or triols, having a molecular weight of from about 2500 to 7500, and at least 50% of the hydroxyl end groups being primary hydroxyl end groups. These polyols are liquids or are capable of being liquified or melted for handling in the polyurethane foaming machine.

Examples of diols or triols well suited to the present invention include linear and branched polyoxypropylene polyols, block copolymers of ethylene oxide and propylene oxide, and polyol grafts of ethylenically unsaturated monomers such as in particular styrene and acrylonitrile on the aforementioned polyols. These polyols will be substantially free from functional groups other than hydroxyl groups and moreover, and as mentioned above, will be in the main tipped with primary hydroxyl groups. In the most preferred embodiments of the invention, at least about 78% of the hydroxyl end groups are primary hydroxyl end groups.

There are a number of suitable polyols available commercially. By way of example only, there is mentioned CP4701 (ex Dow Chemicals), Niax 11-34 (ex Union Carbide Corp). Desmophen 3900 (ex Bayer), Propylan M12 (ex Lankro Chemicals) and Daltocel T 32-75 (ex ICI). "Polymer polyols" are also suitable, i.e. graft polyols containing a proportion of a vinyl monomer, polymerised in situ e.g. Niax 34-28.

Water is usually used in the further blend (ii) as a blowing agent since it liberates carbon dioxide on reaction with excess isocyanate. Alternatively a halogenated hydrocarbon may be used, such as fluorotrichloromethane or methylene chloride. In a further alternative, the blowing agent may be a gas, e.g. air, which is entrained in the system by mechanical means. In some cases a combination of blowing agents may be expedient.

The preferred isocyanate are toluene di-isocyanate (TDI), and polymethylene polyphenyl isocyanate and diphenylmethane di-isocyanate, both of which are known as MDI. Mixtures of these two isocyanates, and mixtures of either of isocyanate with a proportion of a polyol, say CP4701, either separately or together to form an adduct, are also useful. The invention does not preculde the use, however, of other aromatic and aliphatic isocyanates known in the art. The amount of isocyanate required is regulated by the stoichiometry of the reaction, an index of 100 to 105 giving foams with optimum physical property values; but, on either side of these figures, there is scope for making foams having good properties.

The flame-retardant system of the present invention includes about 5 to 20 parts by weight of antimony trioxide, about 15 to 60 parts by weight of a chlorinated paraffin, and about 30 to 80 parts by weight of alumina trihydrate, based on 100 parts by weight of the polyol. Addition of these amounts can easily be tolerated without any significant fall-off in physical properties.

The antimony trioxide will generally be present in the formulation in an amount ranging from 5 to 20 parts by weight, preferably in the range of 8 to 15 parts, and most preferably about 10 parts.

The chlorinated paraffin will usually be present in an amount ranging from 15 to 60 parts by weight, preferably from about 25 to 45 parts and most preferably from about 30 to 40 parts. Alternatively, the paraffin can be expressed in terms of the chlorine content and generally speaking there is present between about 18 and 36 parts, preferably about 20 to 30 parts by weight of chlorine. The term "chlorinated paraffin" as used herein, includes a single chlorinated paraffin, or mixtures thereof.

The chlorinated paraffins usually have a chlorine content of at least 60%, although if a mixture of chlorinated paraffins is used those with less chlorine may be included. The chlorinated paraffins may be either liquid or solid, for example, Cereclor 70L or Cereclor 70. ("Cereclor" is as registered ICI trade mark). In the preferred embodiments of the invention, the chlorinated paraffin is a liquid. These chlorinated paraffins are generally represented by the following emperical formula:

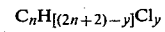

where n usuallyranges from about 10 to 25 and y from about 5 to 25, and preferably n is between about 12 and y is about 11.

Alumina trihydrate, a well-known and readily available material in a finely divided state, may be incorporated into the polyol masterbatch in the same way and at the same time as the antimony compound. Generally, the trihydrate is present in an amount of from 30 to 80 parts by weight, based on 100 parts by weight of the polyol. The efficiency of alumina trihydrate in this flame retardant system is due, it is believed, to a number of factors which are unique in their entirety. It acts as a heat sink in the first instance, and then at about 250° C. the three molecules of water chemically bound in the molecule of alumina trihydrate are evolved as steam thus cooling down the flame front. This enormously assists the otherflame retardants in the system, namely the chlorinated paraffin and the antimony compound. The chlorinated paraffin also breaks down at about 250° C., to liberate hydrogen chloride. It is believed that this hydrogen chloride combines with the antimony trioxide to produce antimony trichloride which is believed to act as a free radical deactivator, thus removing combustible products from the flame front.

Further compounds may be included in the system as required, among them being cross-linking agents, such as low molecular weight (1000 and under) species which will react with isocyanates, exemplified by, but not confined to, polyols, polyamines and amino hydroxy compounds. Tertiary amine and organometallic catalysts, silicone polymers and copolymers and other surfactants, foam stabilisers and bubble modifiers, all known in the polyurethane foam art, may be used. Fillers such as calcium silicate, magnesia, calcium carbonate and barium sulphate may also be included, to confer some special property such as reduced drip on ignition, reduced smoke emission on ignition and sound attenuation.

Normally, foams in accordance with the present invention are cured in an oven the air temperature of which is no greater than 120° C., the mould temperature usually being no greater than 80° C. This is generally referred to as 'cold cure' moulding in contrast to 'hot cure' moulding where the air temperature is usually 175°-200° C. and the mould temperature about 120° C.

In situations where the flame-retardant properties of the foam are critical, for example in applications in the public transportation or hospital fields, the density of the foam will usually be between about 4.5 and 6.5 pounds per cubic foot. Within this range an optimum balance between the flame-retardant properties of the foam and the physical characteristics of the foam is achieved.

Specific examples of the invention will now be illustrated.

Examples I, II and III are flexible foams, suitable for seating, and Example IV is a semi-flexible foam suitable for automotive headrests. All were prepared using conventional foaming techniques. In each case the formulation was supplied in three streams (A), (B) and (C). All parts are by weight.

EXAMPLE I

| | | Parts (by weight) |
|---|---|---|
| (A) | Polyol preblend | |
| | CP 4701[1] | 60.00 |
| | NIAX 34-28[2] | 40.00 |
| | CERECLOR 70L[3] | 35.00 |
| | ANTIMONY TRIOXIDE | 10.00 |
| | ALUMINA TRIHYDRATE[4] | 50.00 |
| | L5307[5] | 2.00 |
| | DIBUTYLTIN DILAURATE (DBTL) | 0.03 |
| (B) | Catalyst preblend | |
| | Water | 2.70 |
| | NIAX A1[6] | 0.20 |
| | NIAX A4[7] | 0.30 |
| | DABCO 33LV[8] | 0.35 |
| (C) | Isocyanate | |
| | 80/20 TD180:20/MDI | 35.5 |

[1]Voranol 4701 - a primary hydroxyl tipped polyether polyol, formed by end blocking a polypropylene triol with ethylene oxide to the stage where the primary hydroxyl content is about 78%; molecular weight about 4700; ex Dow Chemical.
[2]A graft polymer polyol, ex Union Carbide, Hydroxyl number 28.
[3]An ICI chlorinated paraffin having a chlorine content of about 70%.
[4]Finely divided, Alcoa (Registered Trade Mark) AS301.
[5]A silicone surfactant, ex Union Carbide.
[6]A proprietary tertiary amine catalyst, ex Union Carbide.
[7]A proprietary tertiary amine catalyst, ex Union Carbide.
[8]A 33% solution of triethylenediamine in a glycol solution.

This formulation has produced a foam having the following physical properties.

| TEST | RESULT |
|---|---|
| DENSITY CORE APPARENT | 5.3 lb/cu. ft |
| ILD AS PER ASTM D2406 METHOD A 15"×15"×4" | |
| @ 25% compression | 81 lb |
| @ 65% compression | 258 lb |
| @ 225% return | 67.5 lb |
| MODULUS | 3.18 |
| HYSTERESIS | 83.4% |
| TENSILE STRENGTH ASTM D2406 SUFFIX T | 21.4 lb/sq. in |
| ELONGATION ASTM D2406 SUFFIX T | 99% |
| TEAR RESISTANCE ASTM D2406 SUFFIX G | 1.44 lb/in |
| DRY COMPRESSION SET ASTM D2406 METHOD B 50% | 11.4 |
| 75% | 9.0 |
| STEAM AUTOCLAVE ASTM D2406 % change in compression load deflection | 22.0 |
| 50% compression set | 19.0 |
| DRY HEAT AGE ASTM D2406 SUFFIX A % change tensile | 9.3 |
| STATIC FATIGUE HEIGHT LOSS | 4.4% |
| LOAD LOSS | 20.5% |
| DYNAMIC FATIGUE HEIGHT LOSS | 3.7% |
| LOAD LOSS | 19.1% |
| FLAMMABILITY MVSS 302 | SE. |

EXAMPLE II

| | | Parts (by weight) |
|---|---|---|
| (A) | Polyol preblend | |
| | CP 5701 | 60.00 |
| | NIAX 34-28 | 40.00 |
| | CERECLOR 70L | 40.00 |
| | ANTIMONY TRIOXIDE | 10.00 |
| | ALUMINA TRIHYDRATE | 50.00 |
| | DBTL | 0.03 |
| | SILICONE L5307 | 2.0 |
| (B) | Catalyst preblend | |
| | WATER | 2.7 |
| | TRIETHANOLAMINE | 2.0 |
| | DIMETHYLAMINOETHANOL (DMAE) | 0.3 |
| | DABCO 33LV | 0.45 |
| (C) | Isocyanate | |
| | TDI 80/20 | 37.00 |

EXAMPLE III

| | | Parts (by weight) |
|---|---|---|
| (A) | Polyol preblend | |
| | CP 4701 | 60.00 |
| | NIAX 34-28 | 40.00 |
| | CERECLOR 70L | 40.00 |
| | ANTIMONY TRIOXIDE | 10.00 |
| | ALUMINA TRIHYDRATE | 50.00 |
| | L5307 | 2.00 |
| | DBTL | 0.03 |
| (B) | Catalyst preblend | |
| | WATER | 2.7 |
| | TRIETHANOLAMINE | 2.0 |
| | DMAE | 0.3 |
| | DABCO 33LV | 0.45 |
| (C) | Isocyanate | |
| | CP 4701/TDI prepolymer free NCO 25% | 71.4 |

EXAMPLE IV

| | | Parts (by weight) |
|---|---|---|
| (A) | Polyol preblend | |
| | CP 4701 | 100.00 |
| | CERECLOR 70L | 40.00 |
| | ANTIMONY TRIOXIDE | 10.00 |
| | ALUMINA TRIHYDRATE | 50.00 |
| | L5307 | 2.00 |
| (B) | Catalyst preblend | |
| | WATER | 2.5 |
| | TRIETHANOLAMINE | 4.5 |
| | TMBDA | 0.15 |
| | DABCO 33LV | 0.45 |
| (C) | Isocyanate | |
| | MDI | 63.00 |

EXAMPLE V

The three separate streams of Example I were temperature conditioned by means of heated tanks. The temperature of the main polyol stream was 35° C.±1° C. and that of the other two streams was 25° C.±1° C.

A "Halco" low pressure polyurethane moulding machine was used to provide the required quantity from each stream. The pumps on the machine were set to give the requuired stream ratio and output. On injection the chemicals were mixed in a low pressure, high shear mixer and deposited into an open mould. A preset timer was adjusted to determine the duration of pour. The mould was fabricated from steel. The mould was designed to produce a test piece measuring 15"×15"×4". The mould was constructed so as to contain and constrain the rising and reacting foam into the required final shape. It was provided with vents to let out the air, but as little foam as possible, consistent with a high quality surface finish. The mould at pour was at a temperature of 50°±1° C. After pouring the mould was passed through a curing oven (the air temperature of which was approximately 120° C.) for seven and a half minutes. After this time the mould, which was then at a temperature of about 80° C., emerged, was mechanically opened, and the foam moulding stripped. The foam moulding was first crushed between rollers to 10% of its thickness i.e. 90% deflection, and then passed through a postcure oven at 120° C. for 10 minutes.

Meanwhile, the empty mould was recycled back to the pour position being cleaned, sprayed with wax and reheated to 50° C.±1° C.

EXAMPLE VI

The Transport Test was carried out on a moulded foam formulated in accordance with the present invention, more specifically that the subject of Example V.

Listed below are the times and actions/observations:

| TIME | ACTION/OBSERVATION |
|------|---------------------|
| 0.00 | Paper lit. |
| 0.30 | Paper at maximum conflagration level. |
| 1.30 | Foam becomes involved. |
| 2.45 | Paper burnt out completely. |
| 3.20 | All flames out. |

There was very little smoke and fumes, a high char and no dripping.

Accordingly, a high resilience, flexible or semi-flexible, flame-retardant polyether based polyurethane foam is obtained in accordance with the invention. This polyurethane foam exhibits improved flame-retardant properties while maintaining superior physical properties. In this respect, use of a liquid chlorinated paraffin permits increased levels of antimony trioxide to be incorporated into the foam while avoiding viscosity problems during preparation. These polyurethane foams prepared in accordance with the invention are particularly suited to be formed in a cold or warm moulding process and thus are particularly well suited for fabrication of seating for public transport vehicles.

It will thus be seen that the objects set forth above, among those made apparent from the preceding description are efficiently attained and, since certain changes may be made in carrying out the above method and in the composition set forth without departing from the spirit and scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

I claim:

1. A high resilience, flexible or semi-flexible, flame-retardant, polyether based polyurethane foam derived from a diol- or triol-based polyol wherein at least 50% of the hydroxyl end groups are primary hydroxyl end groups and at least one iscoyanate compound and including an effective amount of a flame-retardant system consisting essentially of antimony trioxide, a chlorinated paraffin and alumina trihydrate.

2. The polyurethane foam of claim 1, wherein said flame-retardant system is included in an amount ranging from 45 to 150 parts by weight, based on 100 parts by weight of the polyol.

3. The polyurethane foam of claim 2, wherein the antimony trioxide is present in the flame-retardant system in an amount ranging from about 5 to 20 parts by weight, based on 100 parts by weight of the polyol.

4. The polyurethane foam of claim 2, wherein the chlorine is present in the flame-retardant system in an amount ranging from about 9 to 36 parts by weight, based on 100 parts by weight of the polyol.

5. The polyurethane foam of claim 2, wherein the alumina trihydrate is present in the flame-retardant system in an amount ranging from about 30 to about 80 parts by weight, based on 100 parts by weight of the polyol.

6. The polyurethane foam of claim 1, wherein said flame-retardant system is included in an amount ranging from about 67.5 to 102.5 parts by weight, based on 100 parts by weight of the polyol.

7. The polyurethane foam of claim 6, wherein said flame-retardant system consists essentially of from about 7.5 to 12.5 parts by weight antimony trioxide, from about 20 to 30 parts by weight chlorine and from about 40 to 60 parts by weight alumina trihydrate, all parts by weight based on 100 parts by weight of the polyol.

8. The polyurethane foam of claim 7, having a density of from about 4.5 to 6.5 lbs/cu ft.

9. The polyurethane foam of claims 1 or 6, wherein said polyurethane foam is suitable for moulding.

10. A high resilience, flexible or semi-flexible, flame-retardant, polyether based polyurethane foam derived from a diol- or triol-based polyol wherein at least 50% of the hydroxyl end groups are primary hydroxyl end groups, reacted with at least one isocyanate selected from the group consisting of an isocyanate, a mixture of isocyanates, an isocyanate adduct and an isocyanate prepolymer in the presence of an effective amount of a flame-retardant system consisting essentially of from about 7.5 to 12.5 parts by weight antimony trioxide, a chlorinated paraffin for providing from about 20 to 30 parts by weight chlorine and from about 40 to 60 parts by weight alumina trihydrate, all parts by weight based on 100 parts by weight of the polyol.

11. The polyurethane foam of claim 10, wherein said polyol is a primary hydroxyl tipped polyether polyol formed by end blocking a polypropylene triol with ethylene oxide to the extent where the primary hydroxyl content is about 78% and said polyol has a molecular weight of between about 2500 and 7500, said isocyanate is a mixture of toluene di-isocyanate and polymethylene polyphenol isocyanate and diphenol methane di-isocyanate, said chlorinated paraffin is a liquid chlorinated paraffin having a chlorine content of at least about 60%, and said foam is formed in the presence of water and an amine catalyst.

12. A method for preparing a high resilience, flexible or semi-flexible, flame-retardant, polyether based polyurethane foam comprising:

reacting a first component including a diol- or triol-based polyol having at least 50% of the hydroxyl end groups and a second component including a member selected from the group consisting of an isocyanate, a mixture of isocyanates, an isocyanate adduct and an isocyanate prepolymer; and in the presence of an effective amount of a fire retardant system consisting essentially of antimony trioxide, a chlorinated paraffin and alumina trihydrate, said fire retardant system including in at least one of said first component and said second component;

whereby the mixture is permitted to foam and cure.

13. The method of claim 12, wherein said chlorinated paraffin is in the liquid state.

14. The method of claim 12, further including a catalyst preblend comprising water, a surfactant and an effective amount of an amine catalyst in said first component.

15. A method for preparing a high resilience, flexible or semi-flexible, flame-retardant, polyether based polyurethane foam comprising:

preparing a preblend of a diol- or triol-based polyol wherein at least 50% of the hydroxyl end groups are primary hydroxyl end groups and an effective amount of a flame-retardant system consisting essentially of antimony trioxide, a chlorinated paraffin for providing chlorine and alumina trihydrate;

preparing a further blend including at least one amine catalyst;

mixing the preblend and further blend; and adding at least one isocyanate selected from the group consisting of an isocyanate, a mixture of isocyanates, an isocyanate adduct and an isocyanate prepolymer to the mixture of the preblend and further blend, whereby the foam is permitted to foam and cure.

16. The method of claim 15, wherein said chlorinated paraffin is in the liquid state.

17. The method of claim 16, wherein the further blend includes a blowing agent.

18. A method of moulding a shaped product formed from a high resilience, flexible or semi-flexible, flame-retardant, polyether based polyurethane foam comprising:

mixing, in an enclosed mould, a preblend of a diol- or triol-based polyol wherein at least 50% of the hydroxyl end groups are primary hydroxyl groups and at least one isocyanate compound and an effective amount of a flame-retardant system consisting essentially of antimony trioxide, a chlorinated paraffin for providing chlorine and alumina trihydrate, a further blend including at least one amine catalyst, and at least one isocyanate selected from the group consisting of an isocyanate, a mixture of isocyanates, an isocyanate adduct and an isocyanate prepolymer;

curing the moulded polyurethane, and removing the shaped product from the mould.

* * * * *